United States Patent [19]

Whiteley

[11] 3,979,619

[45] Sept. 7, 1976

[54] PERMANENT MAGNET FIELD STRUCTURE FOR DYNAMOELECTRIC MACHINES

[75] Inventor: Eric Whiteley, Peterborough, Canada

[73] Assignee: Canadian General Electric Co., Ltd., Toronto, Canada

[22] Filed: Aug. 30, 1974

[21] Appl. No.: 502,007

[30] Foreign Application Priority Data

Sept. 24, 1973 Canada .............................. 181935

[52] U.S. Cl. .............................. 310/268; 310/154; 310/156
[51] Int. Cl.² .......................................... H02K 1/22
[58] Field of Search ............. 310/268, 154, 46, 261, 310/162, 163, 164, 266, DIG. 4, 44, 152, 264, 269; 148/101, 103, 108, 31.57; 324/146; 264/DIG. 58; 29/603, 608

[56] References Cited
UNITED STATES PATENTS

| 3,412,461 | 11/1968 | Cochardt | 29/608 |
| 3,431,638 | 3/1969 | Burr | 310/268 |
| 3,488,539 | 1/1970 | Tucker | 310/268 |
| 3,500,095 | 3/1970 | Keogh | 310/268 |
| 3,525,007 | 8/1970 | Henry-Baudot | 310/268 |
| 3,525,008 | 8/1970 | Burr | 310/268 |
| 3,569,753 | 3/1971 | Babikyan | 310/268 |
| 3,655,464 | 4/1972 | Benz | 148/101 |
| 3,668,452 | 6/1972 | Hu | 310/268 |
| 3,811,962 | 5/1974 | Benz | 148/103 |
| 3,836,802 | 9/1974 | Parker | 310/DIG. 4 |

FOREIGN PATENTS OR APPLICATIONS

| 771,292 | 11/1967 | Canada | 310/268 |

Primary Examiner—R. Skudy
Attorney, Agent, or Firm—Vale P. Myles

[57] ABSTRACT

A dynamoelectric machine has a stator and a discoidal rotor with an axial air gap between them. The machine has a permanent magnet field structure wherein each flux-producing component comprises a mosaic of at least one layer of two or more unit permanent magnets per layer.

12 Claims, 7 Drawing Figures

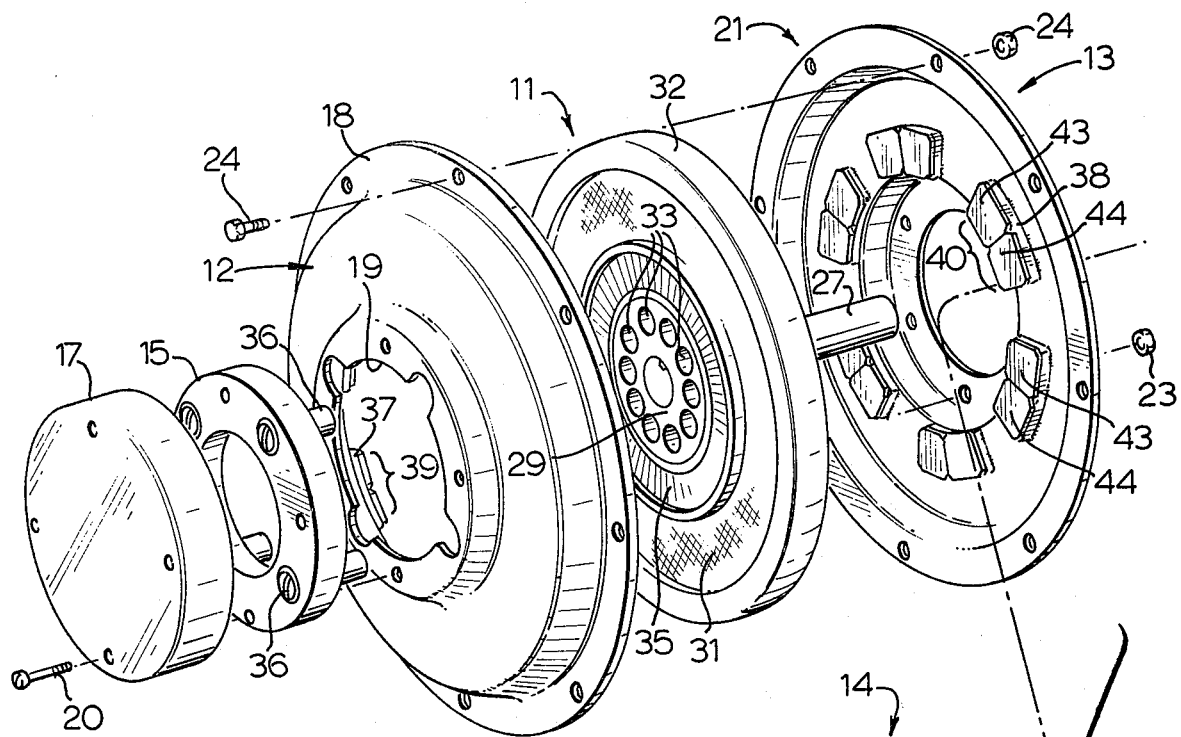
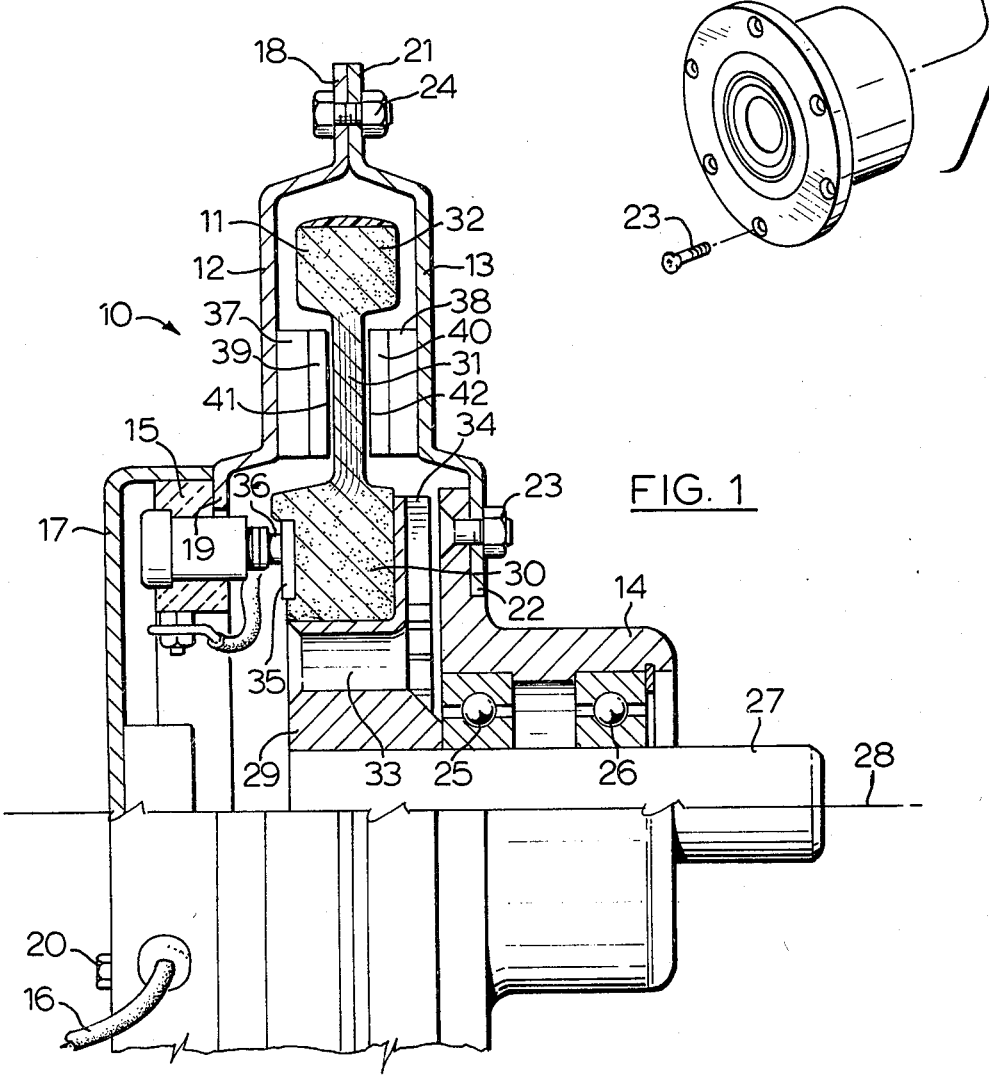
FIG. 2
FIG. 1

PERMANENT MAGNET FIELD STRUCTURE FOR DYNAMOELECTRIC MACHINES

This invention relates to axial air-gap dynamo-electric machines having a permanent magnet field structure and a disc-shaped rotor.

The use of permanent magnets in dynamoelectric machines to provide magnetic fields is now well known, and has found wide application in the smaller machines such as fractional HP motors. Permanent magnets are particularly well suited for use in axial air-gap discoidal rotor machines, as, for example, machines of the general type disclosed in Canadian Pat. Nos. 771,292, issued Nov. 7, 1967, Eric Whiteley and 858,668, issued Dec. 15, 1970, Alastair H. Carter.

Most permanent magnets available commercially are produced by one of two different metallurgical processes. The oldest and best known process consists of producing the magnets from a molten alloy, for example, casting the molten alloy to the required size and shape and then subjecting the solidified mass to a strong magnetic field to give it its permanent magnet properties. Cast alloy magnets can, of course, be made relatively large physically, should the need arise for large permanent magnets. However, large castings often do not make optimum use of the metal in them or cannot be magnetized for optimum magnetic output. When the alloys are expensive, as are the rare-earth alloys, large magnet units become too expensive for many applications where it would otherwise be advantageous to use them. Small units in which every bit of the expensive alloy can be made to work at its upper limit could make them more attractive commercially.

The other process is a powder metallurgy process in which a fine powder of suitable magnetic properties is compacted into a dense mass by means of an hydraulic press and the compacted mass then subjected to heat to bond the particles together in a solid body which will be referred to as a magnetic element or unit magnet. Magnetic orientation is also included in the process. Because compacting the powder requires very high pressures, the physical size of the unit produced is limited by the size of the press available. Hence, in order to be feasible commercially permanent magnets made by compacting powder will usually be very limited in physical size, shape, and the number of unit sizes produced. In other words, the unit magnets will be rather small, of simple shapes, and the units sizes limited. Powders are now available for producing permanent magnets that have properties making the magnets well suited for use in dynamoelectric machines, for example, powders of the rare-earth alloys. As both the alloy and process are expensive, small and simple shapes appear to be the most attractive commercially because they use the least material and yield the greatest magnetic output per unit of material.

The small unit magnets referred to above are too small for use in many dynamoelectric machine ratings. Therefore, the object of this invention is to provide in an axial gap dynamoelectric machine a permanent magnet field structure making better use of the small unit magnets.

The invention is applicable to a dynamoelectric machine having a discoidal rotor, a field structure, at least one primary magnetic flux path contained in the field structure, the rotor and the gap therebetween, and means for supporting the rotor for rotation in magnetically linked relation with the field structure. According to the invention, the magnetic flux in a primary path is provided by a mosaic of permanent magnets included in the path in the configuration of at least one layer of two or more unit magnets per layer.

A better understanding of the invention may be had from the following description taken with the accompanying drawings, in which:

FIG. 1 is a view in elevation of a dynamoelectric machine constructed according to the invention and showing the main components in outline in cross section;

FIG. 2 is an exploded view in perspective of the machine shown in FIG. 1;

Figure 3:
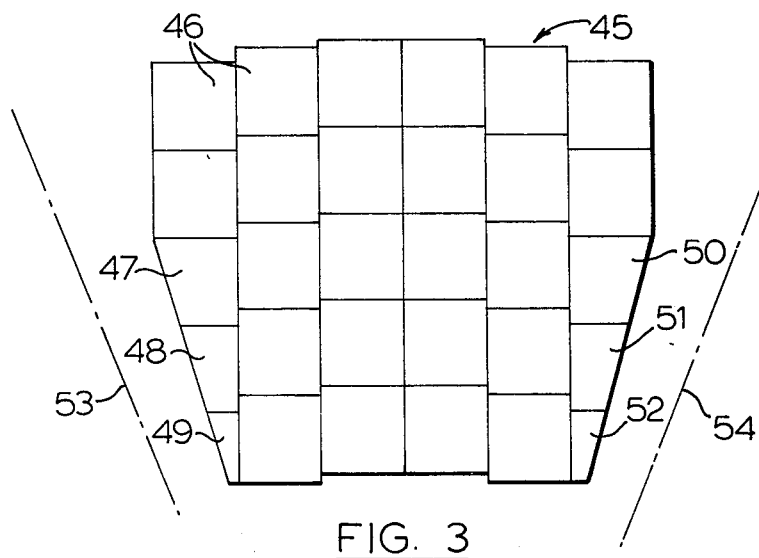
FIGS. 3 and 4 are face on views of one pole of a multipole machine showing mosaics of unit permanent magnets.

In FIGS. 1 and 2 there is shown a dynamoelectric machine 10 constructed according to the invention. This machine is illustrated as a DC machine, and it may be used either as a motor or as a generator. However, for purposes of the description to follow the machine is intended to be used as a motor, and it will be referred to hereinafter as a motor. Machine 10 consists essentially of a rotor 11 supported for rotation in a stator having housing members 12 and 13, rotor supporting structure 14, brush gear 15, leads 16 and a cover 17 for the brush gear.

Housing members 12 and 13 are dish-shaped members made of a magnetic material such as mild steel and serve as the yoke of the magnetic field circuit and provide a substantial portion of the enclosure for the machine. Member 12 has an outer edge portion 18, an open centre defined by the inner edge portion 19, and has the brush gear 15 and cover 17 therefore secured to this inner edge portion by means of a number of bolts 20. Member 13 has an outer edge portion 21, an open centre defined by the inner edge portion 22, and has the bearing retaining member 14 secured to this inner edge portion by means of a number of bolts 23. Members 12 and 13 are secured together at their outer edge portions 18 and 21 by means of a number of bolts 24. The rotor supporting structure includes member 14 and the ball bearings 25 and 26 which are mounted inside the member and carry the shaft 27 of rotor 11. The bearings support the rotor for rotation on its axis 28. Leads 16 provide a circuit for connecting the brushes on gear 15 to a power source.

Rotor 11 resembles a disc wheel. It consists of the following annular portions disposed concentrically about axis 28; a shaft 27; an inner hub 29 secured to shaft 27; an outer hub 30 secured to the inner hub; a disc portion 31 integral with the outer hub; and a rim 32 integral with the disc portion. Hub 30, disc portion 31 and rim 32 consist of a plurality of coils nested together in an annular array and bonded together by means of a resinous material, e.g., an epxoy resin, to provide a strong and rigid discoidal rotor structure wherein the electrical conductors of the coils reinforce the resinous mass mechanically. Each coil has its active sides disposed radially in the disc and its end heads in the hub and rim respectively. A rotor answering this description is described in more detail in the copending U.S. application Ser. No. 557,159, filed March 10, 1975, E. Whiteley. Discoidal rotors also suitable for use with the permanent magnet field structure of this invention are disclosed in the two Canadian patents mentioned in the introduction. The inner hub 29 serves as a means for supporting the discoidal structure on the shaft for rotations in a plane normal to axis 28 and also as a fan for circulating a cooling medium counterclockwise around the discoidal structure, the hub having a number of axial fluid flow passages 33 and a number of radially disposed blades 34 for impelling the fluid outwardly. In the illustrations of FIGS. 1 and 2, rotor 11 is the armature of the machine. It has a commutator consisting of an annular array of segments 35 connected to the various coil ends of the armature winding and bonded to the outer hub portion 30 by means of the resin that bonds the coils together. Brush gear 15 carries a number of conductive brushes 36 which bear against the commutator and thereby connect the armature winding to leads 16.

One pair of a number of pole pairs is shown in FIG. 1 as consisting of magnetic spacing members 37 and 38 attached to housing members 12 and 13 respectively and permanent magnets 39 and 40 attached to members 37 and 38 respectively, components 37 and 39 being regarded as one pole structure and components 38 and 40 as the other pole structure of the pair. Each pole structure 37, 39 projects from housing member 12 and terminates in a flat pole face 41 on the magnet lying in a plane normal to axis 28 and spaced somewhat from the flat surface on disc portion 31 of the rotor. Each pole structure 38, 40 projects from housing member 13 and terminates a flat pole face 42 on the magnet lying in a plane normal to axis 28 and spaced somewhat from the other flat surface on disc portion 31 of the rotor. This allows the rotor freedom of rotation between the various pairs of poles. Spacers 37 and 38 may be pieces of a mild steel welded to the housing members and the magnets may be bonded to them by means of an epoxy or a methyl-2-cyanoacrylate (Eastman 910) adhesive. In the interest of manufacturing economy, magnets 39 and 40 will usually be flat on both sides and of uniform thickness, in which case the spacers will be shaped to position the magnets for the required distance between their pole faces 41, 42. pole faces 41, 42 are of opposite magnetic polarity so that permanent magnets 39, 40 aid in providing magnetic flux in the gap between their faces, i.e., the gap containing the rotor disc. Since spacers 37, 38 and housing members 12, 13 are made of magnetic materials they provide return flux paths.

In FIG. 1, the disc portion 31 of the rotor is shown uniform in thickness. This is not always desirable; for example, in some machines it may taper from the hub to the rim, i.e., the disc portion is thicker at the hub than it is at the rim, Such a rotor is illustrated and described in the aformentioned Canadian Pat. No. 771,292. It is possible, and indeed sometimes desirable, to use only one of the permanent magnets 39 or 40 in a pole structure 37 to 40, in which case the spacer will be thick enough to fill the space left by the magnet that is removed. In some designs, it may be desirable to eliminate spacers 37 and 38 and deform the walls of housing members 12 and 13 inwardly so that the magnets can be mounted directly on the deformations, or even mount the magnets on an undeformed wall. Although it is preferable to have the magnets define the pole faces, this is not always necessary; the magnets may be located under pole shoes. In some pole structures the magnet may be mounted on one wall and the other wall made a pole face. These and other variations of the field structure shown in FIG. 1 are well within the capability of one skilled in the art.

Permanent magnets such as the ceramic, e.g., ferrite compounds, and in particular the cobalt-rare earth magnets, e.g., cobalt samarium compounds, are characterized by a very high coercive force. These magnets are therefore well suited for use in a disc rotor machine where the gap between pole faces is relatively wide. Because the manufacture of cermaic and cobalt-rare earth magnets involve complex processing, they are most readily made in simple shapes that are also rather small. Small units of simple shapes are, of course, less expensive to produce by such processes than are large complicated shapes. Moreover, the magnetic material itself is expensive; hence it is very important that a unit magnet minimize material content and maximize permanent properties. These goals are best achieved by using relatively small unit magnets of simple shapes. Small unit magnets can be readily applied to disc rotor machines of the type shown in FIGS. 1 and 2.

According to the invention, a permanent magnet field pole structure for use with a discoidal rotor has at least one flux path which includes a path of poles defining a gap for the rotor. A mosaic of at least one layer of two or more unit magnets per layer is incorporated in the path for magnetizing it and thereby providing flux in the gap linked with the rotor. Mosaics of unit magnets make it possible to provide a wide range of permanent magnet field pole structures with but a few standardized sizes of the units. This leads to economies in permanent magnet machines because they come in many sizes.

FIG. 2 shows in perspective housing member 13 and the field pole structures attached to it, in this particular case six structures 38, 40. The other housing member 12 has six like pole structures 37, 39 attached to it, and they are located directly opposite structures 38, 40, i.e., the machine has six pairs of poles. Each one of the six pole structures shown in FIG. 2 consists of a spacing member 38 and a mosaic of two unit magnets 43, 44 mounted on the spacer side-by-side to define a pole face 42. In this case, the unit magnets are bonded to the spacer by means of an adhesive of the type mentioned earlier. As seen on the pole faces, unit magnets 43, 44 are trapezoidal in shape, and they are located close together in order to minimize the loss of magnetism at the joint. The magnets are uniform in thickness, and in the interest of economy this thickness will usually be just sufficient to give the magnet the magnetic properties needed in the machine.

The exposed faces of the unit magnets of the six pole structures 38, 40 lie in a common plane and the faces on the complementary structures 37, 39 lie in another common plane; these are spaced planes normal to axis 28. It is to be understood that in the case of a rotor having one or both sides of its disc portion 31 tapered, the pole faces will lie in surfaces which conform closely with the disc surfaces. Each pair of unit magnets 43, 44 are magnetically oriented in the same sense, the opposite faces of each pair of pole structures are of opposite polarity, the polarities of the pole structures complement each other in producing flux across the rotor, and members 12, 13, 37, 38 complete the flux paths.

FIG. 3 shows another mosaic 45 of unit permanent magnets in a pole structure of a relatively large dynamoelectric machine, e.g., an 8 pole, 50-H.P., disc rotor motor. Mosaic 45 is made up of 24 identical square units 46 and six trapezoidal units 47 to 52 cut from square units 46 and placed edge-to-edge in a pattern having an outline of a symmetrical trapezoid. Units 47 and 49 are cut from one square unit 46, units 50 and 52 from another, and units 48 and 51 from yet another. The units are of equal dimension in their direction of magnetic orientation, i.e., thickness, are secured with one flat side against a flat pole surface as by means of an adhesive, and have their magnetic orientation in the same polarity sense, i.e., perpendicular to the plan form of FIG. 3, so that the flat upper faces of the units present a flat pole face of one magnetic polarity. They are placed with their edges as close together as possible in order to minimize flux leakage between units, or in other words, make the mosaic behave as a single magnet. Furthermore, the units are no thicker than necessary to give the magnetic output needed. Lines 53 and 54 designate the centre lines between mosaic 45 and the mosaics to the left and right. These lines converge on the axis of rotation and the edges defined by units 47 to 52 will conform generally with these lines. Pole faces of trapezoidal outline are best suited for the pole structure in a machine having a discoidal rotor such as the type of machine shown in FIG. 1.

Figure 4:
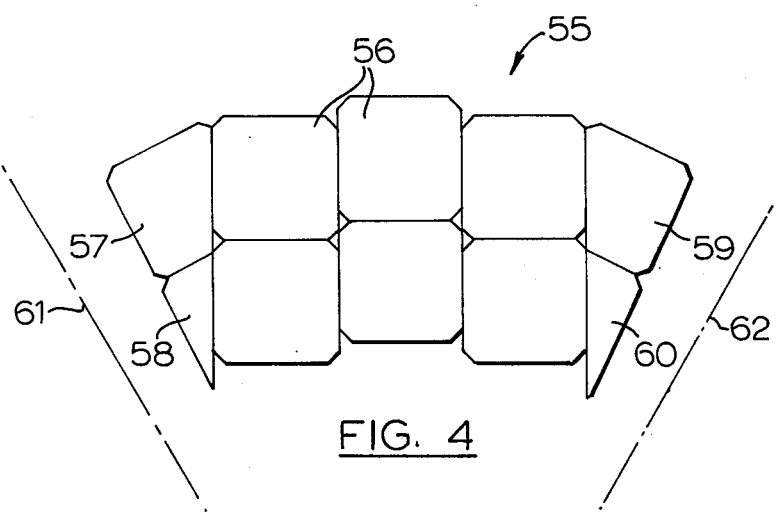

FIG. 4 illustrates a third mosaic of unit permanent magnets for use in the field structure of a somewhat smaller machine. Units 56 are square with rounded corners and units 57 and 58 are cut from a unit 56, as are units 59 and 60. This mosaic also presents a flat pole face of generally trapezoidal outline, an outline conforming with the interpolar space available as delineated by the interpolar axis 61 and 62.

Figure 5:
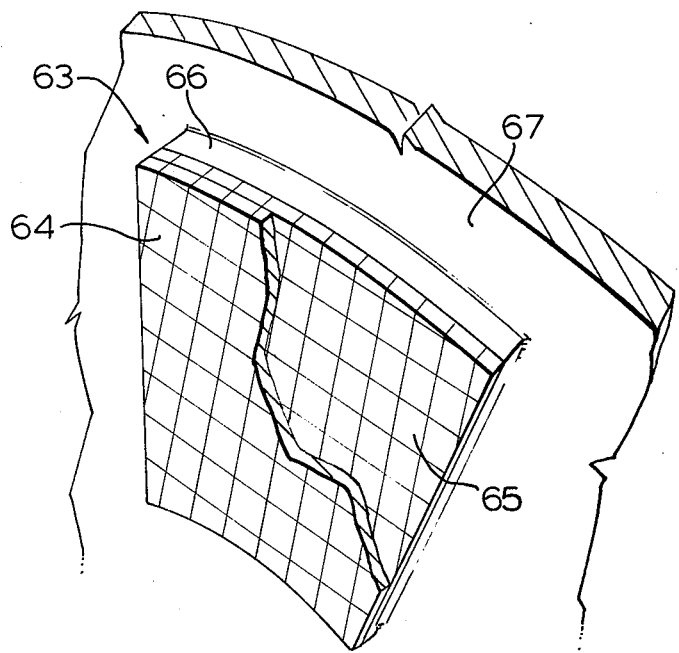
FIG. 5 is a persepctive view of one pole of a multipole machine showing a double layer of unit permanent magnets.

In some applications of permanent magnets, it may be desirable to provide more than one layer of units in a mosaic in order to obtain the coercive force needed. According to the invention, it is possible to have two or even more layers, although one is usually sufficient as in FIG. 2. FIG. 5 illustrates a mosaic 63 of two layers 64 and 65 of unit magnets mounted on a pole body 66, which body in turn is mounted on a yoke 67.

Figure 6:
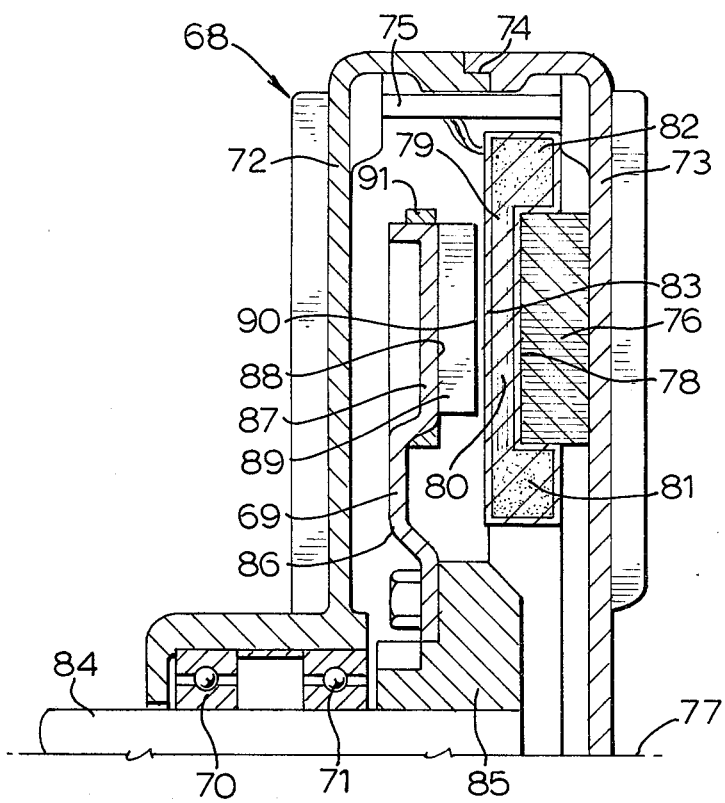
FIGS. 6 and 7 are views in section of synchronous motors constructed according to the invention.
Figure 7:
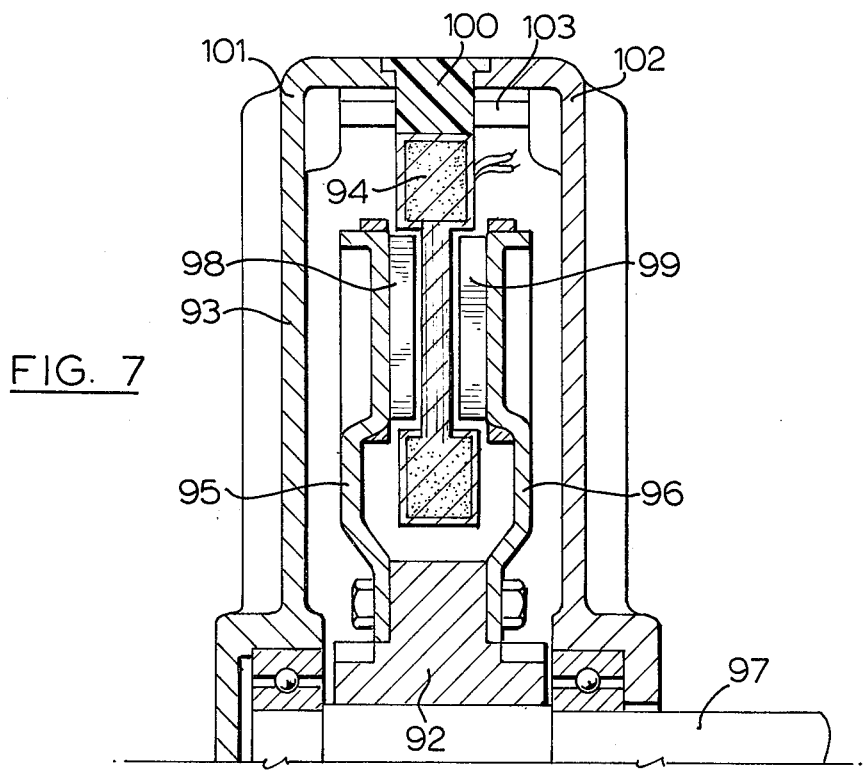

In FIGS. 1 and 2, the winding is an integral part of the rotor and the permanent magnet field structure is a part of the stator. This machine is illustrated as a DC machine where the rotor is the armature. It is possible to modify the winding so that it becomes the AC component of a synchronous machine, e.g., a synchronous motor. FIGS. 6 and 7 illustrate two versions of synchronous machines having permanent magnet field circuits employing mosaics of unit magnets.

The synchronous machine 68 illustrated in FIG. 6 has a disc-shaped rotor 69 supported for rotation on axis 77 by means of bearing 70 and 71 in the stator. The stator consists of two housing members 72 and 73 formed with alignment means 74 and a number of tie members 75 holding these parts in assembled relation. An annular magnetic core 76 composed of a spirally wound strip of magnetic steel is secured to the inside surface of member 73 coaxial with axial 77. This core has a flat face 78 lying in a plane that is normal to axis 77. An annular winding structure 79 having a flat disc portion 80 and enlarged ring portions 81 and 82 is carried by the core with the flat disc portion resting against face 78 and the ring portions overhanging the curved surfaces of the core. The exposed side 83 of the disc portion presents a flat surface normal to axis 77. Winding structure 79 is essentially a distributed AC winding which when energized with alternating current produces a rotating magnetic field. Its conductors are packed together and bonded together by means of a resinous material. The ring portions contain the end heads of the coils and the disc portion one or more layers of radial coil sides lying in the path of the rotor flux.

Rotor 69 consists of a shaft 84 carried by bearings 70, 71, a hub 85 on the shaft, and a disc 86 of magnetic material secured to the hub. The disc is formed with a plurality of equally spaced deformations 87 having flat surfaces 88 thereon facing the winding side 83, spaced therefrom, and lying in a plane normal to axis 77. A mosaic 89 of unit permanent magnets is secured to each surface 88 on the disc. The mosaics project axially toward the winding and terminate in a flat pole face 90 normal to axis 77 and spaced slightly from winding side 83. Pole faces 90 are of alternate north and south magnetic polarity so that magnetic flux is provided between them and core face 78, the magnetic disc 86 and magnetic core 76 completing the flux paths. This flux is linked by the winding conductors, whereby the machine can be made to operate either as an AC generator or as a synchronous motor.

The machine of FIG. 6 may also be provided with an amortisseur winding 91 as is common practice with synchronous machines. It serves the same purposes in this machine as it does in conventional machines.

FIG. 7 shows another version of the type of synchronous machine shown in FIG. 6. This machine has a rotor 92, a stator 93 and an AC winding structure 94. Rotor 92 has two magnetic discs 95 and 96 which may be attached to one shaft 97 or to two separate shafts. Disc 95 is provided with a plurality of pole structures 98 disposed axially opposite like pole structures 99 on disc 96. Each pole structure includes a mosaic of unit permanent magnets presenting a flat pole face. The discs are essentially the same as the one shown in FIG. 6. The polarities of the pole structures are such that the poles complement each other and the discs complete the magnetic paths.

Winding structure 94 is essentially the same as winding structure 79; it is supported by the stator with its disc portion located between poles 98 and 99. An annular portion 100 on the periphery of the winding structure is clamped between the stator members 101 and 102 by means of a number of tie members 103 which also hold the stator members in assembled relation. The two machines are alike functionally.

For a more complete description of the types of machines shown in FIGS. 6 and 7, reference is made to U.S. application Ser. No. 556,995, filed Mar. 10, 1975, E. Whiteley.

The presently known rare earth permanent magnets best suited for use in these machines are produced from a finely powdered material which is pressed to shape while the particles are aligned in a magnetic field. The compacts are then sintered and magnetized to the required permanent magnet state. These processes are most economical when large numbers of identical units are produced by automated steps. The process equipment is most economical if the unit magnets are small in size rather than very large. On the other hand, the dynamoelectric machines in which this disclosure proposes such magnets be used, are usually manufactured in a wide range of sizes and in relatively small quantities for each size at any one time. These two requirements are reconciled if the pole faces in the machines are built up from a mosaic of standardized magnet units to produce the required total pole face size and shape. The rare earth magnets are well suited in their magnetic properties to this treatment without significant loss of magnetism at the joints, provided the joint gaps are kept small. Joint gaps should be no wider than necessary to accommodate mechanical tolerances in the unit magnet shape, and practical assembly tolerances. This last requirement is met by choosing appropriate geometric shapes for the unit magnets. Polygonal shapes meet the joint criterial, e.g., hexagonal, square, rectangular, triangular, trapezoidal, etc. Round or oval shapes do not meet the optimum gap requirement. Various methods are available for securing the unit magnets of a mosaic to a base structure. These methods include the adhesive bonding method mentioned earlier and also methods such as low temperature soldering or brazing. Since the base structure is made of a good magnetic material and the unit permanent magnets have an extremely high affinity for hanging onto the base, the film of adhesive or solder between the flat surfaces will not be subjected to the full forces imposed on the magnets.

Discoidal rotor machines of the type described herein have relatively wide non-magnetic gaps between pole faces. Since rare-earth permanent magnets have high coercive force, they are well suited for the use in wide gap machines. By their use it is possible to make the machines smaller lighter and more efficient than conventional machines of comparable output. Although the rare-earth magnets are preferred, ceramic, e.g. ferrite compounds, magnets can be used to advantage in some machines. The use of ceramic magnets will, of course, increase the physical size of the machine.

What I claim as new and desire to secure by Letters Patent of the United States is:

1. A discoidal type dynamoelectric machine comprising at least two relatively rotatable members separated by an axial gap; means defining at least one closed magnetic flux path included in said members and said gap; an electric winding linked electromagnetically with said path; and a mosaic of at least one layer of two or more unit permanent magnets per layer mounted on one of said relatively rotatable members and located in said path for producing magnetic flux therein oriented axially in said gap.

2. The machine of claim 1 further characterized by the unit magnets being of polygonal shapes in face outline.

3. The machine of claim 1, further characterized by said unit magnets being bonded to said one of said relatively rotatable members by means of an adhesive film between a flat surface on the member and a flat face on the unit magnets.

4. A dynamoelectric machine as defined in claim 1 wherein said relatively rotatable members comprise a stator having two yoke members spaced apart and made of a magnetic material and a discoidal rotor mounted for rotation in the space between said yoke members on an axis transverse thereto; and including a plurality of pole structures mounted on at least one of said yoke members and located in said space in angularly spaced relation around said axis, said pole structures providing axially directed flux paths from one yoke member to the other through said rotor; a mosaic of at least one layer of two or more unit permanent magnets per layer being included in each flux path, said unit magnets of a layer being arranged edge-to-edge in a flat pattern with the magnetic axis thereof in the direction of said axis; and an electric winding linked electromagnetically with said flux paths.

5. The machine of claim 4 wherein said discoidal rotor comprises said winding and a resinous material bonding the winding conductors together in a unitary structure having a hub and a rim containing the coil end heads and an intermediate disc portion containing the coil sides; and conductors on the rotor engaged by other conductors on the stator for conducting current between the rotor and stator.

6. The machine of claim 5 wherein each one of said pole structures comprises a first pole head on one yoke member terminating in a mosaic of one layer of unit magnets defining a flat first pole face on one side of the rotor disc portion adjacent thereto and a second pole head on the other yoke member terminating in a second pole face on the other side of the rotor disc portion adjacent thereto and directly opposite the first pole face.

7. The machine of claim 5 wherein each one of said pole structures comprises a first pole head on one yoke member terminating in a mosaic of one layer of unit magnets defining a flat first pole face on one side of the rotor disc portion adjacent thereto and a second pole head on the other yoke member terminating in another mosaic of one layer of unit magnets defining a flat second pole face on the other side of the rotor disc portion adjacent thereto and directly opposite the first pole face.

8. The machine of claim 6 wherein the pole faces defined by said mosaic of unit magnets are trapezoids having converging edges on lines, when extended, meet on said axis.

9. A dynamoelectric machine comprising a stator having an annular magnetic yoke defining one gap surface of an axial air gap machine; a winding linked electromagnetically with said annular yoke; a rotor having a magnetic yoke spaced axially from said gap surface; an annular array of complementary permanent magnet pole structures on the yoke of said rotor adjacent said gap surface; each one of said pole structures comprising a plurality of unit permanent magnets having flat parallel faces and of face outline suitable for edge-to-edge arrangement in a mosaic like pattern; and means for securing said mosaic of unit magnets to said rotor yoke with one flat face of each unit against a flat surface on the rotor yoke, said unit magnets having the magnetic orientation thereof in the same polarity sense and having the same physical dimension in the direction of orientation whereby the other flat faces of the unit magnets present a flat pole face facing said gap surface on the stator core but spaced axially therefrom.

10. A dynamoelectric machine comprising a pair of disc-shaped rotors supported for rotation on the same axis in axially spaced relation, each one of said rotors having a magnetic yoke; a stator; an annular pancake winding located between said rotor yokes transversely of said axis and supported by said stator; an annular array of an equal number of complementary permanent magnet pole structures on each rotor yoke located adjacent said winding; each one of said pole structures comprising a plurality of unit permanent magnets having flat parallel faces and of face outline, suitable for edge-to-edge arrangement in a mosaic like pattern; and means for securing said mosaic of unit magnets to said rotor yoke with one flat face of each unit against a flat surface on the rotor yoke, said unit magnets having the magnetic orientation thereof in the same polarity sense and having the same physical dimension in the direction of orientation whereby the other flat faces of the unit magnets present a flat pole face facing said winding but spaced axially therefrom.

11. The machine of claim 10 wherein at least some of the unit magnets are triangular in face outline.

12. The machine of claim 10 wherein said pole face has substantially the outline of a symmetrical trapezoid and the major portion of the unit magnets have the following shape in face outline: trapezoidal, and the remaining unit magnets have divisions of said shape and define straight converging edges on the symmetrical trapezoid.

* * * * *